(12) United States Patent
Shibata et al.

(10) Patent No.: US 8,351,752 B2
(45) Date of Patent: Jan. 8, 2013

(54) FLEXIBLE OPTICAL WAVEGUIDE, METHOD FOR MANUFACTURING SUCH FLEXIBLE OPTICAL WAVEGUIDE, AND OPTICAL MODULE

(75) Inventors: Tomoaki Shibata, Ibaraki (JP); Atsushi Takahashi, Ibaraki (JP); Hiroshi Masuda, Ibaraki (JP); Toshihiko Takasaki, Ibaraki (JP); Tatsuya Makino, Ibaraki (JP); Masami Ochiai, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/281,658

(22) PCT Filed: Mar. 2, 2007

(86) PCT No.: PCT/JP2007/054064
§ 371 (c)(1),
(2), (4) Date: Sep. 4, 2008

(87) PCT Pub. No.: WO2007/102431
PCT Pub. Date: Sep. 13, 2007

(65) Prior Publication Data
US 2009/0010604 A1 Jan. 8, 2009

(30) Foreign Application Priority Data

Mar. 6, 2006 (JP) .................................. 2006-059395
May 18, 2006 (JP) .................................. 2006-138898

(51) Int. Cl.
*G02B 6/10* (2006.01)
*G02B 6/12* (2006.01)
*C03B 37/023* (2006.01)

(52) U.S. Cl. ............................. 385/132; 385/14; 65/385

(58) Field of Classification Search .......... 385/123–132, 385/147
See application file for complete search history.

(56) References Cited

U.S. PATENT DOCUMENTS 5,311,539 A * 5/1994 Behfar-Rad et al. ............. 372/96
(Continued)

FOREIGN PATENT DOCUMENTS

JP 07-239422 9/1995
(Continued)

OTHER PUBLICATIONS

Takasaki et al., "Optical Waveguide Film", Hitachi Kasei Technical Report, No. 48, Jan. 2001, pp. 17-22.

(Continued)

*Primary Examiner* — Ryan Lepisto
*Assistant Examiner* — Robert Tavlykaev
(74) *Attorney, Agent, or Firm* — Antonelli, Terry, Stout & Kraus, LLP.

(57) ABSTRACT

The present invention relates to a flexible optical waveguide prepared by using a resin film for forming an optical waveguide for at least one of a lower cladding layer, a core layer and an upper cladding layer, wherein a ten point average roughness (Rz) on a surface of either one of the lower cladding layer and the upper cladding layer is 0.5 μm or more and 10 μm or less, a production process for the same and an optical module prepared by using the flexible optical waveguide. Provided are a flexible optical waveguide which is excellent in an adhesive property in compounding with an electric printed wiring board and turning a flexible optical waveguide into a multilayer, a production process for the same and an optical module prepared by using the flexible optical waveguide.

16 Claims, 2 Drawing Sheets

U.S. PATENT DOCUMENTS

| | | | |
|---|---|---|---|
| 5,540,346 A * | 7/1996 | Fujimoto et al. | 216/24 |
| 6,088,492 A * | 7/2000 | Kaneko et al. | 385/14 |
| 7,025,849 B2 * | 4/2006 | Kim et al. | 156/257 |
| 7,418,165 B2 * | 8/2008 | Glebov et al. | 385/14 |
| 7,664,358 B2 * | 2/2010 | Hikita et al. | 385/130 |
| 2003/0026569 A1 * | 2/2003 | Eldada et al. | 385/129 |
| 2003/0086679 A1 * | 5/2003 | Gao et al. | 385/143 |
| 2003/0180030 A1 * | 9/2003 | Hirose et al. | 385/147 |
| 2004/0013953 A1 * | 1/2004 | Mune et al. | 430/18 |
| 2004/0021237 A1 | 2/2004 | Shimizu et al. | |
| 2004/0033446 A1 | 2/2004 | Kim | |
| 2004/0179804 A1 * | 9/2004 | Kuramoto et al. | 385/131 |
| 2005/0117847 A1 * | 6/2005 | Ono et al. | 385/49 |
| 2005/0205885 A1 * | 9/2005 | Nakagawa et al. | 257/98 |
| 2006/0008225 A1 * | 1/2006 | Naitou et al. | 385/129 |
| 2006/0029891 A1 * | 2/2006 | Mune et al. | 430/321 |
| 2006/0098926 A1 * | 5/2006 | Shelnut et al. | 385/129 |
| 2006/0133756 A1 * | 6/2006 | Shelnut et al. | 385/129 |

FOREIGN PATENT DOCUMENTS

| | | |
|---|---|---|
| JP | 2002-286957 | 10/2002 |
| JP | 2003-315580 | 11/2003 |
| JP | 2004-287396 | 10/2004 |
| JP | 2004-302188 | 10/2004 |
| JP | 2001-007461 | 1/2007 |

OTHER PUBLICATIONS

Extended European Search Report dated Mar. 23, 2011, including Supplementary European Search Report and European Search Opinion, for EP Application No. 07715158.7-1524/1992970 (PCT/JP2007/054064).

D. V. Rosato, et al., "Injection molding handbook", Dec. 31, 2000, p. 348 (XP002627709).

* cited by examiner

FLEXIBLE OPTICAL WAVEGUIDE, METHOD FOR MANUFACTURING SUCH FLEXIBLE OPTICAL WAVEGUIDE, AND OPTICAL MODULE

TECHNICAL FIELD

The present invention relates to a flexible optical waveguide, a production process for the same and an optical module prepared by using the flexible optical waveguide.

BACKGROUND ART

In high speed and high density signal transmission between electronic devices and between printed wiring boards, transmission through conventional electric wirings is restricted in a rise in a speed and a density due to barriers brought about by mutual interference and attenuation of signals. In order to break through such restrictions, investigated is a technology of connecting electronic devices and printed wiring boards to each other by means of light, so-called optical interconnection. Flexible optical waveguides having flexibility are considered to be suited to the light path from the viewpoints of easy connection to devices and substrates and easy handling.

When a flexible optical waveguide is integrated with an electric printed wiring board to turn them into a composite matter, an adhesive has to be used to adhere both. In general, an outer layer of a flexible optical waveguide, that is, a cladding layer is highly smooth, and a surface area thereof brought into contact with the adhesive can not sufficiently be secured. Accordingly, an adhesive strength exerted by an anchor effect can not be exhibited, and it is difficult to obtain a strong adhesive property.

Also, when a flexible optical waveguide is turned into a multilayer to highly integrate an optical circuit, a problem of the same adhesive property is brought about.

A polymer film optical waveguide is proposed as a flexible optical waveguide (e.g., refer to a patent document 1). A polymer film is prepared by applying a solution of a polymer on a substrate of silicon and the like by spin coating and baking it to form a lower cladding layer. A core layer is formed by the same method, and then a mask pattern is formed with a Si-containing photoresist and dry-etched to thereby form a core pattern. Thereafter, an upper cladding layer is formed by the same method as the method by which the lower cladding layer is formed. Finally, the optical waveguide is peeled off from the substrate to thereby prepare a flexible optical waveguide turned into a film. In particular, a thermally oxidized silicon substrate is used as the substrate in order to make it easy to peel off the optical waveguide, and a method in which the substrate is immersed in hydrofluoric acid is shown as a method by which the optical waveguide is peeled off from the above silicon substrate after forming the optical waveguide.

However, in the flexible optical waveguide described above, an outer layer surface of the cladding layer has a high smoothness, and therefore the adhesive property described above is a problem in compounding with an electric printed wiring board or turning a flexible optical waveguide into a multilayer.

A production process for the flexible optical waveguide described above takes time for forming the respective layers of a lower cladding layer, a core layer and an upper cladding layer, and a liquid material is applied on a substrate to form a film, so that control of the film thickness is complicated. In addition thereto, since the resin coated on the substrate is liquid before curing, the resin flows on the substrate, and it is difficult to maintain an evenness of the film thickness. Therein problems originating in that the material form is liquid are involved.

Further, silicon is used for the substrate, and therefore it is not suited for producing an optical waveguide having a size of 10 cm or more in a large quantity. Also, the production process described above has a dry etching step which is a high vacuum process, and dry etching has to be carried out for very long time in order to prepare a multiple mode optical waveguide comprising a thick core layer.

Patent document 1: JP 7-239422 A

DISCLOSURE OF THE INVENTION

In light of the problems described above, an object of the present invention is to provide a flexible optical waveguide which is excellent in an adhesive property in compounding with an electric printed wiring board and turning a flexible optical waveguide into a multilayer, a production process for the same and an optical module prepared by using the flexible optical waveguide.

Intensive investigations repeated by the present inventors have resulted in finding that the problems described above can be solved by the method described above. That is, the present invention relates to the following (1) to (5):

(1) A flexible optical waveguide prepared by using a resin film for forming an optical waveguide for at least one of a lower cladding layer, a core layer and an upper cladding layer, wherein a ten point average roughness (Rz) on a surface of either one of the lower cladding layer and the upper cladding layer is 0.5 µm or more and 10 µm or less.

(2) A flexible optical waveguide prepared by using a resin film for forming an optical waveguide for at least one of a lower cladding layer, a core layer and an upper cladding layer, wherein a ten point average roughness (Rz) on a surface of either one of the lower cladding layer and the upper cladding layer is 0.5 µm or more and 10 µm or less, and Rz on a surface of the other is less than 0.5 µm.

(3) A production process for a flexible optical waveguide comprising a lower cladding layer, a core pattern and an upper cladding layer, comprising:
 a step in which a resin film for forming a cladding layer prepared on a substrate having a ten point average roughness (Rz) of 0.5 µm or more and 10 µm or less on a surface thereof is used for at least one of the lower cladding layer and the upper cladding layer to prepare an optical waveguide and
 a step in which the above substrate is then removed from the a resin film for forming a cladding layer.

(4) The production process for a flexible optical waveguide according to the above item (3), wherein the substrate having a ten point average roughness (Rz) of 0.5 µm or more and 10 µm or less on a surface thereof is a metal foil.

(5) An optical module prepared by using the flexible optical waveguide as described in the above item (2), wherein a light emitting element or a light receiving element is loaded on a surface of either one of a lower cladding layer and an upper cladding layer in which a ten point average roughness (Rz) is 0.5 µm or more and 10 µm or less.

According to the present invention, capable of being provided are a flexible optical waveguide which is excellent in an adhesive property in compounding with an electric printed wiring board and turning flexible optical waveguides into a multilayer, a production process for the same and an optical module prepared by using the flexible optical waveguide.

EXPLANATION OF REFERENCE NUMERALS

Figure 1:
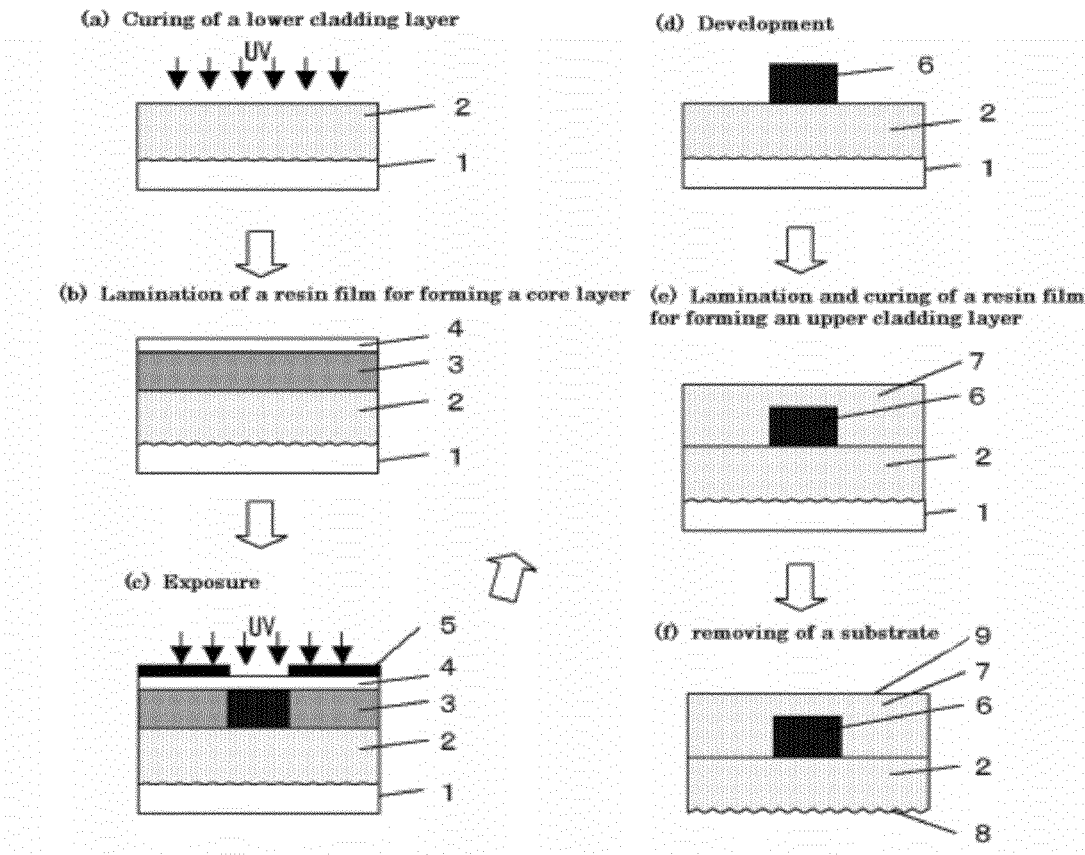
FIG. 1 is a drawing for explaining the production process for the flexible optical waveguide according to the present invention.

1; Substrate
2; Lower cladding layer
3; Core layer
4; Substrate film for a core layer
5; Photo mask
6; Core pattern
7; Upper cladding layer
8; Roughened surface
9; Smooth surface
10; Adhesive layer
11; Electric printed wiring board
12; Light emitting element or light receiving element
13; Optical path transforming part

BEST MODE FOR CARRYING OUT THE INVENTION

Flexible optical waveguide and optical module:

The embodiment of the flexible optical waveguide of the present invention includes, for example, an optical waveguide constituted from a core pattern 6 having a high refractive index, a lower cladding layer 2 and an upper cladding layer 7 which are having a low refractive index according to an example shown in FIG. 1 (*f*). The core pattern 6 is formed by exposing and developing a core layer 3 as shown in FIGS. 1 (*c*) and (*d*).

The flexible optical waveguide of the present invention is prepared, in light of a material form thereof, by using a film-like material for forming an optical waveguide (hereinafter referred to as a resin film for forming an optical waveguide) for at least one of the lower cladding layer, the core layer and the upper cladding layer. Use of the resin film for forming an optical waveguide makes it possible to produce a flexible optical waveguide which meets an enlargement of the area without bringing about problems originating in a liquid form of the material.

The resin film for forming an optical waveguide used in the present invention is designed so that the resin film for forming an optical waveguide used for the core layer (hereinafter referred to as the resin film for forming a core layer) has a higher refractive index than that of the resin film for forming an optical waveguide used for the cladding layer (hereinafter referred to as the resin film for forming a cladding layer).

The flexible optical waveguide of the present invention is characterized by that a ten point average roughness (hereinafter referred to as Rz according to definition of JIS B0601-1994) on a surface of either one of the lower cladding layer and the upper cladding layer is 0.5 µm or more and 10 µm or less. This makes it possible to obtain a flexible optical waveguide which is excellent in an adhesive property with an electric printed wiring board or an adhesive property between optical waveguides on the above surface by making efficient use of an anchor effect on the above surface.

Rz of 0.5 µm or more makes it possible to obtain the satisfactory anchor effect and secure the adhesive strength. On the other hand, Rz of 10 µm or less removes necessity of increasing a thickness of the cladding layer in order to avoid an effect of transmission loss caused by light scattering and makes it possible to improve a bending property of the flexible optical waveguide. From the viewpoints described above, Rz falls preferably in a range of 1 to 5 µm.

Figure 4:
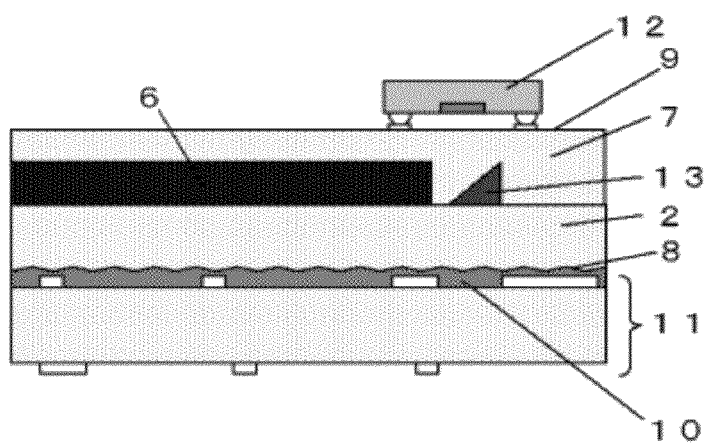
FIG. 4 is a drawing for explaining an optical module prepared by using the flexible optical waveguide of the present invention.

If Rz on a surface of either one of the lower cladding layer and the upper cladding layer is 0.5 µm or more and 10 µm or less in the flexible optical waveguide, the flexible optical waveguide which is excellent in an adhesive property can be prepared, and in the case of an optical module prepared by using the flexible optical waveguide, in which a light emitting element or a light receiving element 12 is loaded, as shown in, for example, FIG. 4, on the surface (the surface 9 of the upper cladding layer 7 in the example of FIG. 4) of the cladding layer in the optical waveguide equipped with an optical path transforming part, Rz on the above surface 9 is preferably small from the viewpoint of reducing optical coupling loss.

From the viewpoints described above, in the flexible optical waveguide of the present invention, a ten point average roughness (Rz) on the surface of either one of the lower cladding layer and the upper cladding layer is preferably 0.5 µm or more and 10 µm or less, and Rz on the surface of the other is preferably less than 0.5 µm. In an optical module prepared by using the above flexible optical waveguide, a light emitting element or a light receiving element is preferably loaded on the surface of either one of the lower cladding layer and the upper cladding layer in which Rz on a surface is less than 0.5 µm, and from the viewpoint of reducing optical coupling loss, Rz on the above surface is more preferably 0.3 µm or less.

A process for obtaining the flexible optical waveguide of the present invention shall not specifically be restricted as long as it is a process comprising a step in which a surface of either one of the lower cladding layer and the upper cladding layer is roughened so that Rz on the above surface falls in a range of 0.5 µm or more and 10 µm or less.

A method for roughening the above surface includes a method in which the above surface is roughened at the same time as preparing the optical waveguide and a method in which the above surface is subjected to roughening processing after preparing the optical waveguide.

The method in which the above surface is roughened at the same time as preparing the optical waveguide includes a method in which a resin film for forming a cladding layer prepared on a substrate having Rz of 0.5 µm or more and 10 µm or less on a surface thereof is used to prepare an optical waveguide in at least one of the lower cladding layer and the upper cladding layer and in which the above substrate is then removed from the above film to thereby transfer the surface form of the substrate onto the film. This makes it possible to simplify roughening processing. In the flexible optical waveguide of the present invention, the method in which the surface is roughened at the same time as preparing the optical waveguide is preferred from the viewpoint of simplifying the production.

The substrate described above shall not specifically be restricted in a material thereof as long as Rz on the surface is 0.5 µm or more and 10 µm or less, and it includes metal foils such as copper foil, nickel foil, aluminum foil and the like, polyesters such as polyethylene terephthalate and the like, polyolefins such as polypropylene, polyethylene and the like, polyamide, polycarbonate, polyphenylene ether, polyether sulfide, polyphenylene sulfide, polyallylate, liquid crystal polymers, polysulfone, polyether sulfone, polyether ether ketone, polyetherimide, polyamideimide, polyimide and the like.

Among them, the metal foils are preferred from the viewpoints of readily preparing the resin film for forming a cladding layer in roll-to-roll, readily obtaining a strength as the support, enabling to remove the substrate by etching after preparing the optical waveguide and being advantageous for the productivity.

Among the metal foils, a copper foil used for conventional printed wiring boards is more preferred.

An etching solution used when the substrate is a copper foil includes a ferric chloride solution, a cupric chloride solution, an alkali etching solution, a hydrogen peroxide etching solution and the like. Among them, the ferric chloride solution is preferably used from the viewpoint of a good etching factor.

A thickness of the metal foil falls preferably in a range of 10 to 60 μm from the viewpoints of a handling property and shortening of time for removing the metal foil by etching. If it is 10 μm or more, faults such as producing wrinkles in handling are prevented from being caused. If it is 60 μm or less, the metal foil can be removed by etching in a short time. From the viewpoints described above, a thickness of the metal foil falls more preferably in a range of 25 to 45 μm.

The method in which the above surface is roughened after preparing the optical waveguide includes, for example, sand blast processing, dry etching such as reactive ion etching and the like and wet etching carried out by using chemical compounds such as organic solvents, acids, alkalis and the like.

The resin film for forming an optical waveguide used in the present invention comprises a resin composition for forming an optical waveguide, and to be specific, it is constituted preferably from a resin composition comprising (A) a base polymer, (B) a photopolymerizable compound and (C) a photopolymerization initiator.

The base polymer (A) is used in order to ensure a strength of a cured matter such as a film when it is formed and shall not specifically be restricted as long as an object thereof can be achieved, and it includes phenoxy resins, epoxy resins, (meth)acrylic resins, polycarbonate, polyallylate, polyetheramide, polyetherimide, polyether sulfone and derivatives thereof. The above base polymers may be used alone or in a mixture of two or more kinds thereof.

Among the base polymers shown above as the examples, the polymers having an aromatic skeleton in a main chain are preferred from the viewpoint of a high heat resistance, and the phenoxy resins are particularly preferred.

Also, from the viewpoint of capable of being three-dimensionally cross-linked and enhancing a heat resistance, epoxy resins, in particular, epoxy resins which are solid at room temperature (25° C.) are preferred.

Further, when the resin composition comprising the components (A), (B) and (C) is used to form a film, a transparency of the film is preferably ensured, and in order to meet this, the base polymer has preferably a high compatibility with the photopolymerizable compound (B) described later in details. From this point of view, the phenoxy resins and the (meth) acrylic resins described above are preferred. In this connection, a (meth)acrylic resin means an acrylic resin and a methacrylic resin.

The phenoxy resin described above is an amorphous polymer and is represented by the following Formula (I).

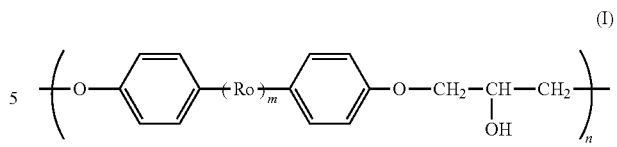

wherein n is an integer of 1 or more; m is 0 or 1; and —$R_0$— is a group represented by the following Formula (II), (III), or (IV) or —O—.

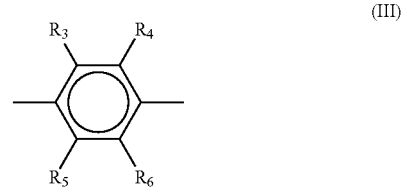

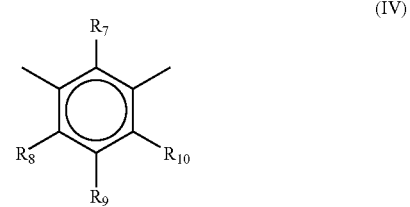

wherein $R_1$ to $R_{10}$ each are independently a hydrogen atom or an organic group represented by methyl, trifluoromethyl and the like.

Among the phenoxy resins described above, a straight chain polymer of a bisphenol A type epoxy resin having a repeating unit represented by the following Formula (V) has a high heat resistance and therefore is preferred.

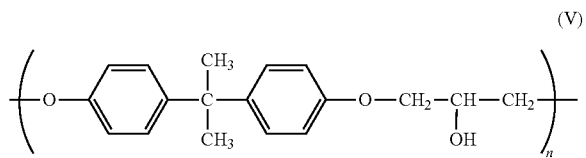

wherein n is the same as described above.

In general, the phenoxy resin of the straight chain polymer described above is produced by a single step method in which bisphenol A and epichlorohydrin are subjected to polycondensation reaction or a two step method in which a low molecular epoxy resin and bisphenol A are subjected to polyaddition reaction.

Specific examples thereof include "YP-50" (trade name) manufactured by Tohto Kasei Co., Ltd. and resins described in Japanese Patent Application Laid-Open No. 4-120124, Japanese Patent Application Laid-Open No. 4-122714 and Japanese Patent Application Laid-Open No. 4-339852.

Further, in addition to the phenoxy resins represented by Formula (I) described above, also known as phenoxy resins are polymers obtained by subjecting various difunctional epoxy resins and bisphenols to polyaddition reaction, for example, brominated phenoxy resins (Japanese Patent Application Laid-Open No. 63-191826 and JP-B-8-26119), bisphenol A/bisphenol F copolymer type phenoxy resins (Japanese Patent No. 2917884 and Japanese Patent No. 2799401), phosphorus-containing phenoxy resins (Japanese Patent Application Laid-Open No. 2001-310939), high heat-resistant phenoxy resins in which a fluorene skeleton is introduced (Japanese Patent Application Laid-Open No. 11-269264 and Japanese Patent Application Laid-Open No. 11-302373) and the like.

The phenoxy resins shown below represented by the bisphenol A/bisphenol F copolymer type phenoxy resins described above are suitably used as the component (A) in the present invention. That is, the phenoxy resin contains as structural units of the copolymer component, (a-1) at least one selected from bisphenol A, bisphenol A type epoxy compounds and derivatives thereof and (a-2) at least one selected from bisphenol F, bisphenol F type epoxy compounds and derivatives thereof.

Use of the resin composition for forming an optical waveguide as the component (A), which contains the resin comprising the component (a-1) and the component (a-2) as the copolymerizable components makes it possible to improve more an interlayer adhesive property between the cladding layer and the core layer and a pattern formability (responsiveness between fine lines or narrow lines) in forming a core pattern of the optical waveguide and makes it possible to form fine patterns having a small line width and a small line space.

Bisphenol A, the bisphenol A type epoxy compound and the derivatives thereof suitably include tetrabromobisphenol A, tetrabromobisphenol A type epoxy compounds and the like.

Further, bisphenol F, the bisphenol F type epoxy compound and the derivatives thereof suitably include tetrabromobisphenol F, tetrabromobisphenol F type epoxy compounds and the like.

The base polymer (A) of the present invention includes, as described above, particularly preferably bisphenol the A/bisphenol F copolymer type phenoxy resins, and, for example, a trade name "Phenotohto YP-70" manufactured by Tohto Kasei Co., Ltd. is available therefor.

Next, the epoxy resin which is solid at room temperature (25° C.) includes, for example, bisphenol A type epoxy resins such as "Epotohto YD-7020, Epotohto YD-70.59 and Epotohto YD-70.57" (trade names) manufactured by Tohto Kasei Co., Ltd. and "Epicoat 10.50, Epicoat 1009 and Epicoat 1008" (trade names) manufactured by Japan Epoxy Resins Co., Ltd.

A molecular weight of the base polymer (A) is preferably 5,000 or more, further preferably 10,000 or more and particularly preferably 30,000 or more in terms of a number average molecular weight from the viewpoint that capable of being formed is even a resin film for forming an optical waveguide having a thickness of about 50 μm which is required to optical waveguide materials for optical interconnection. An upper limit of the number average molecular weight shall not specifically be restricted, and it is preferably 1,000,000 or less, more preferably 500,000 or less and particularly preferably 200,000 or less from the viewpoints of a compatibility with the photopolymerizable compound (B) and the exposing and developing property. The number average molecular weight is a value determined by measurement gel permeation chromatography (GPC) and calculation in term of standard polystyrene.

A blending amount of the base polymer (A) is preferably 5 to 80 mass % based on the whole amount of the component (A) and the component (B).

If the above blending amount is 5 mass % or more, it is easy to form a film from the resin composition containing the photopolymerizable compound (B) and photopolymerization initiator (C). In particular, when forming the resin film for forming an optical waveguide, it is more preferably 10 mass % or more since even a film having a film thickness of 50 μm or more can readily be formed.

On the other hand, if the above blending amount is 80 mass % or less, a pattern formability of the resin composition is improved, and the photocuring reaction proceeds sufficiently when forming the optical waveguide. From the above viewpoints, a blending amount of the base polymer (A) is more preferably 20 to 70 mass %.

Next, the photopolymerizable compound (B) shall not specifically be restricted as long as it is polymerized by irradiation with light such as a UV ray and the like, and it includes compounds having an ethylenically unsaturated group in a molecule thereof and compounds having two or more epoxy groups in a molecule thereof.

Among them, the compounds having an ethylenically unsaturated group in a molecule thereof are preferred from viewpoint of a reactivity to light. To be specific, it includes (meth)acrylates, vinylidene halides, vinyl ether, vinylpyridine, vinylphenol and the like. Among them, the (meth)acrylates are preferred from the viewpoints of a transparency and a heat resistance.

Any of monofunctional, difunctional and tri- or more polyfunctional (meth)acrylates can be used for the (meth)acrylates. In this connection, (meth)acrylate means acrylate and methacrylate.

The monofunctional (meth)acrylate includes methoxypolyethylene glycol (meth)acrylate, phenoxypolyethylene glycol (meth)acrylate, lauryl(meth)acrylate, isostearyl (meth)acrylate, 2-(meth)acryloyloxyethyl succinate, paracumylphenoxyethylene glycol (meth)acrylate, 2-tetrahydropyranyl(meth)acrylate, isobornyl(meth)acrylate, methyl(meth)acrylate, ethyl(meth)acrylate, butyl(meth)acrylate, benzyl(meth)acrylate and the like.

Also, the difunctional (meth)acrylate includes ethoxylated 2-methyl-1,3-propanediol di(meth)acrylate, neopentyl glycol di(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, ethoxylated polypropylene glycol di(meth)acrylate, propoxylated ethoxylated bisphenol A diacrylate, ethylene glycol di(meth)acrylate, triethylene glycol di(meth)acrylate, tetraethylene glycol di(meth)acrylate, polyethylene glycol di(meth)acrylate, polypropylene glycol di(meth)acrylate, ethoxylated bisphenol A di(meth)acrylate, tricyclodecane di(meth)acrylate, ethoxylated cyclohexane dimethanol di(meth)acrylate, 2-hydroxy-1-acryloxy-3-methacryloxypropane, 2-hydroxy-1,3-dimethacryloxypropane, 9,9-bis[4-[(2-acryloyloxyethoxy)phenyl]fluorene, 9,9-bis(3-phenyl-4-acryloylpolyoxyethoxy)fluorene, epoxy(meth)acrylates of a bisphenol A type, a phenol novolak type, a cresol novolak type and a glycidyl ether type and the like.

Further, the tri- or more polyfunctional (meth)acrylate includes ethoxylated isocyanuric acid tri(meth)acrylate, ethoxylated glycerin tri(meth)acrylate, trimethylolpropane tri(meth)acrylate, ethoxylated trimethylolpropane tri(meth)acrylate, pentaerythritol tri(meth)acrylate, pentaerythritol tetra(meth)acrylate, ethoxylated pentaerythritol tetra(meth)acrylate, propoxylated pentaerythritol tetra(meth)acrylate, ditrimethylolpropane tetra(meth)acrylate, caprolactonemodified ditrimethylolpropane tetra(meth)acrylate, dipentaerythritol hexa(meth)acrylate and the like. They may be used alone or in combination of two or more kind thereof.

Among the above compounds, at least one di- or more polyfunctional (meth)acrylate is preferably used as the component (B) from the viewpoint of capable of curing with the base polymer being entangled therewith into a three-dimensional network structure produced by polymerization.

Also, epoxy(meth)acrylate is preferably used as the difunctional (meth)acrylate from the viewpoint that a transparency can be consistent with a heat resistance.

Representative epoxy(meth)acrylate includes bisphenol A epoxy acrylate represented by the following Formula (VI).

Bisphenol A epoxy acrylate has an excellent compatibility with a phenoxy resin and can achieve a high transparency, and therefore it is a very preferable embodiment to use a phenoxy resin as the component (A) and bisphenol A epoxy acrylate as the component (B). The above bisphenol A epoxy acrylate is commercially available as EA-1020 (trade name, manufactured by Shin-Nakamura Chemical Co., Ltd.).

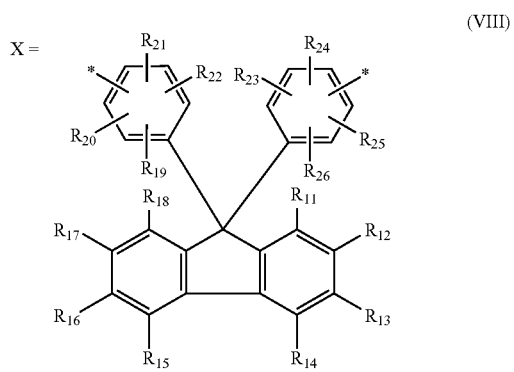

wherein $R_{11}$ to $R_{26}$ each represent independently a hydrogen atom, an alkyl group having 1 to 12 carbon atoms, an alkoxy group having 1 to 6 carbon atoms, an alkoxycarbonyl group having 2 to 7 carbon atoms, an aryl group having 6 to 10

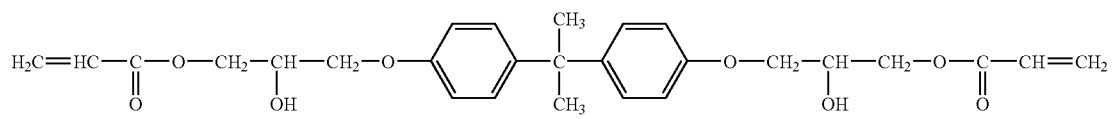

carbon atoms or an aralkyl group having 7 to 9 carbon atoms; $R_{19}$ to $R_{26}$ each may be present in any position of the benzene rings, and X is connected to oxygen atoms in the skeleton of the Formula (VII) at sites (marks "*" in Formula (VIII)) to which the above substituents are not bonded. Compounds in which Y is a hydrogen atom and $R_{11}$ to $R_{26}$ each are hydrogen atoms and p is 1 and q is 1 in Formula (VII) and (VIII) can be obtained as a commercial product (trade name "A-BPEF", manufactured by Shin-Nakamura Chemical Co., Ltd.). The fluorene di(meth)acrylate described above and a compound having at least one (meth)acryloyl group in a molecule thereof can also be used in combination as the component (B).

The compound having two or more epoxy groups in a molecule thereof includes, to be specific, difunctional aromatic glycidyl ethers such as bisphenol A type epoxy resins, tetrabromobisphenol A type epoxy resins, bisphenol F type epoxy resins, bisphenol AD type epoxy resins, naphthalene type epoxy resins and the like; multifunctional aromatic glycidyl ethers such as phenol novolak type epoxy resins, cresol novolak type epoxy resins, dicyclopentadiene-phenol type epoxy resins, tetraphenylolethane type epoxy resins and the like; difunctional aliphatic glycidyl ethers such as polyethylene glycol type epoxy resins, polypropylene glycol type epoxy resins, neopentyl glycol type epoxy resin, hexanediol type epoxy resins and the like; difunctional alicyclic glycidyl ethers such as hydrogenated bisphenol A type epoxy resins and the like; multifunctional aliphatic glycidyl ethers such as trimethylolpropane type epoxy resins, sorbitol type epoxy resins, glycerin type epoxy resins and the like; difunctional aromatic glycidyl esters such as diglycidyl phthalate and the like; difunctional alicyclic glycidyl esters such as diglycidyl tetrahydrophthalate, diglycidyl hexahydrophthalate and the like; difunctional aromatic glycidylamines such as N,N-diglycidylaniline, N,N-diglycidyltrifluoromethylaniline and the like; multifunctional aromatic glycidylamines such as N,N,N',N'-tetraglycidyl-4,4-diaminodiphenylmethane, 1,3-bis(N,N-glycidylaminomethyl)cyclohexane, N,N',O-triglycidyl-p-aminophenol and the like; difunctional alicyclic epoxy resins Further, acryl(meth)acrylate is suitably used as the component (B) from the viewpoint of a transparency, and particularly when a (meth)acrylic resin is used as the component (A) in combination, it is preferred in terms of an effect thereof.

Acryl(meth)acrylate shall not specifically be restricted, and it is usually obtained by adding monofunctional (meth)acrylate to a polymer of glycidyl acrylate. The above monofunctional (meth)acrylate includes various ones, and it includes, for example, (meth)acrylic acid and the same ones as shown as the examples of the monofunctional (meth)acrylate. In this connection, (meth)acrylic acid means acrylic acid and methacrylic acid.

When forming the optical waveguide, the core layer has to be designed so that it has, as described later, a higher refractive index than that of the cladding layer. The photopolymerizable compound (B) preferably contains fluorene di(meth)acrylate as a constituent considering a high refractive index in addition to a high transparency, a high heat resistance and a compatibility with the component (A). In particular, fluorene di(meth)acrylate represented by the following Formula (VII) is preferably contained as a constituent.

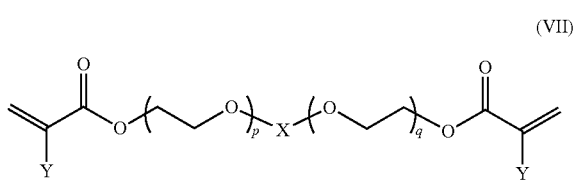

wherein X is represented by the following Formula (VIII); Y is a hydrogen atom or methyl group; and p and q each are an integer of 1 to 20, preferably an integer of 1 to 10.

such as alicyclic diepoxy acetal, alicyclic diepoxy adipate, alicyclic diepoxy carboxylate, vinyl cyclohexene dioxide and the like; difunctional heterocyclic epoxy resins such as diglycidyl hydantoin and the like; multifunctional heterocyclic epoxy resins such as triglycidyl isocyanurate and the like; and difunctional or multifunctional silicon-containing epoxy resins such as organopolysiloxane type epoxy resins and the like.

The above compounds having two or more epoxy groups in a molecule thereof usually have a molecular weight of 100 to 2,000, more preferably 150 to 1,000, and the compounds which are liquid at room temperature are suitably used. The above compounds can be used alone or in combination of two or more kinds thereof. Further, they can be used as well in combination with other photopolymerizable compounds. A molecular weight of the photopolymerizable compound (B) can be measured by a GPC method or a mass spectrometric method.

A blending amount of the photopolymerizable compound (B) described above is preferably 20 to 95 mass % based on the whole amount of the component (A) and the component (B). If the above blending amount is 20 mass % or more, it is easy to cure with the base polymer being entangled therewith, and provided is the advantage that a pattern formability is enhanced when the core pattern is formed in forming the optical waveguide. On the other hand, if it is 95 mass % or less, it is easy to form a film by adding the component (A). Further, the blending amount is preferably 90 mass % or less from the viewpoint that the film having a large thickness is readily formed. From the viewpoints described above, the blending amount of the photopolymerizable compound (B) is more preferably 30 to 80 mass %.

The photopolymerization initiator (C) shall not specifically restricted as long as it is a compound which polymerizes the photopolymerizable compound (B) by irradiating with a light such as a UV ray. For example, when a compound having an ethylenically unsaturated group in a molecule thereof is used for the component (B), the photopolymerization initiator (C) includes aromatic ketones such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 2-benzyl-2-dimethylamino-1-(4-morpholinophenyl)-butan-1-one, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1,2-methyl-1-[4-(methylthio)phenyl]-2-morpholinopropan-1-one, 1-[4-(phenylthio)phenyl]-1,2-octadione-2-benzoyloxime and the like; quinones such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, 2,3-dimethylanthraquinone and the like; benzoin ether compounds such as benzoin methyl ether, benzoin ethyl ether, benzoin phenyl ether and the like; benzoin compounds such as benzoin, methylbenzoin, ethylbenzoin and the like; benzyl derivatives such as benzyl dimethyl ketal and the like; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, 2-(p-methoxyphenyl)-4,5-diphenylimidazole dimer and the like; phosphine oxides such as bis(2,4,6-trimethylbenzoyl)phenylphosphine oxide, bis(2,6-dimethoxybenzoyl)-2,4,4-trimethylpentylphosphine oxide, 2,4,6-trimethylbenzoyldiphenylphosphine oxide and the like; acridine derivatives such as 9-phenylacridine, 1,7-bis(9,9'-acridinyl)heptane and the like; N-phenylglycine; N-phenylglycine derivatives; coumarin-based compounds and the like.

Further, in the 2,4,5-triarylimidazole dimer, two 2,4,5-triarylimidazoles may have the same substituents on the aryl groups thereof to provide the symmetric compound or may have different substituents on the aryl groups thereof to provide the asymmetric compound.

As is the case with combination of diethylthioxanthone and dimethylaminobenzoic acid, thioxanthone compounds and tertiary amine compounds may be combined. They can be used alone or in combination of two or more kinds thereof.

Among them, the aromatic ketones and the phosphine oxides are preferred from the viewpoint of enhancing a transparency of the core layer and the cladding layer.

When an epoxy resin is used for the component (B), the photopolymerization initiator (C) includes, for example, aryldiazonium salts such as p-methoxybenzenediazonium hexafluorophosphate and the like; diaryliodonium salts such as diphenyliodonium hexafluorophosphonium salt, diphenyliodonium hexafluoroantimonate and the like; triarylsulfonium salts such as triphenylsulfonium hexafluorophosphonium salt, triphenylsulfonium hexafluoroantimonate, diphenyl-4-thiophenoxyphenylsulfonium hexafluorophosphonium salt, diphenyl-4-thiophenoxyphenylsulfonium hexafluoroantimonate, diphenyl-4-thiophenoxyphenylsulfonium pentafluorohydroxyantimonate and the like; triallylselenonium salts such as triphenylselenonium hexafluorophosphonium salt, triphenylselenonium borofluoride, triphenylselenonium hexafluoroantimonate and the like; dialkylphenacylsulfonium salts such as dimethylphenacylsulfonium hexafluoroantimonate, diethylphenacylsulfonium hexafluoroantimonate and the like; dialkyl-4-hydroxyphenylsulfonium salts such as 4-hydroxyphenyldimethylsulfonium hexafluoroantimonate, 4-hydroxyphenylbenzylmethylsulfonium hexafluoroantimonate and the like; and sulfonic acid esters such as α-hydroxymethylbenzoinsulfonates, N-hydroxyimidosulfonates, α-sulfonyloxyketone, β-sulfonyloxyketone and the like. They can be used alone or in combination of two or more kinds thereof.

A blending amount of the photopolymerization initiator (C) described above is preferably 0.5 to 10 mass parts per 100 mass parts of the total amount of the component (A) and the component (B). If the above blending amount is 0.5 mass part or more, the photosensitivity is satisfactory. On the other hand, if it is 10 mass parts or less, absorption on a surface layer of the photosensitive resin composition does not grow large in exposure, and photocuring is promoted sufficiently in an inside thereof. Further, in using as an optical waveguide, transmission loss caused by influence of light absorption by the polymerization initiator itself is not increased, and it is suited. From the viewpoints described above, a blending amount of the photopolymerization initiator (C) is more preferably 0.2 to 5 mass parts.

In addition to the components (A), (B) and (C) described above, so-called additives such as inner mold releasing agents, antioxidants, yellowing preventives, UV absorbents, visible light absorbing agents, coloring agents, plasticizers, stabilizers, fillers and the like may be added, if necessary, to the resin composition for forming an optical waveguide in a proportion in which adverse influence is not exerted to the effects of the present invention.

The resin composition for forming an optical waveguide is designed so that the resin composition for forming an optical waveguide used for the core layer (hereinafter referred to as the resin composition for forming a core layer) has a higher refractive index than that of the resin composition for forming an optical waveguide used for the cladding layer (hereinafter referred to as the resin composition for forming a cladding layer).

A resin composition which can form a core pattern by an actinic ray can be used as the resin composition for forming a core layer, and a light-sensitive resin composition can suitably be used. To be specific, it is a resin composition which contains the components (A), (B) and (C) described above and which contains, if necessary, the optional components described above.

The resin composition for forming a cladding layer shall not specifically be restricted as long as it is a resin composition which has a lower refractive index than that of the resin composition for forming a core layer and which is cured by light or heat, and a light-sensitive resin composition or a heat-curing resin composition can suitably be used. To be specific, it is a resin composition which contains the components (A), (B) and (C) described above and which contains, if necessary, the optional components described above.

The resin film for forming an optical waveguide used in the preset invention comprises the resin composition for forming an optical waveguide described above, and it can readily be produced by dissolving a resin composition containing the components (A), (B) and (C) described above in a solvent to prepare a resin varnish, coating it on a substrate by a spin coating method and the like and removing the solvent. A coating machine used for coating the resin varnish shall not specifically be restricted, and an applicator, a spin coater and the like can be used. A coating machine which can continuously produce a resin film is preferably used from the viewpoint of a productivity. The above coating machine includes, for example, Multicoater TM-MC manufactured by Hirano Tecseed Co., Ltd.

In this regard, the solvent used shall not specifically be restricted as long as it can dissolve the above resin composition, and capable of being used are, for example, solvents such as acetone, methyl ethyl ketone, methyl cellosolve, ethyl cellosolve, toluene, N,N-dimethylformamide, N,N-dimethylacetamide, propylene glycol monomethyl ether, propylene glycol monomethyl ether acetate and the like and mixed solvents thereof. Propylene glycol monomethyl ether acetate is preferably used from the viewpoint of obtaining a film having an excellent smoothness on a resin surface of a side reverse to the substrate. Usually, a content of solid components in the resin solution is preferably 30 to 80 mass %.

In preparing the resin varnish described above, it is mixed preferably by stirring. The stirring method shall not specifically be restricted, and a method using a propeller is preferred from the viewpoint of a stirring efficiency. A rotating speed of the propeller shall not specifically be restricted, and it is preferably 10 to 1,000 rpm, more preferably 50 to 800 rpm and particularly preferably 100 to 500 rpm from the viewpoints of sufficiently mixing the components contained in the resin varnish and inhibiting air bubbles produced by rotation of the propeller from being mixed in. The stirring time shall not specifically be restricted, and it is preferably 1 to 24 hours from the viewpoint of the mixing property and the production efficiency.

The resin varnish prepared is preferably filtrated through a filter having a pore diameter of 50 μm or less. If a pore diameter of the filter is 50 μm or less, large foreign matters are removed, and cissing is not caused in coating the varnish. From the above viewpoint, a pore diameter of the a filter is more preferably 30 μm or less, particularly preferably 10 μm or less.

The resin varnish prepared is preferably defoamed under reduced pressure. The defoaming method shall not specifically be restricted, and a combination of a vacuum pump and a bell jar and a deforming apparatus equipped with a vacuum device and the like can be used as the specific examples. The pressure in the reduced pressure shall not specifically be restricted, and pressure at which a solvent contained in the resin varnish is not boiled is preferred. The time for reducing pressure shall not specifically be restricted, and it is preferably 3 to 60 minutes from the viewpoints that air bubbles dissolved in the resin varnish are removed and that the solvent is inhibited from being volatilized.

The substrate used in a step for producing the resin film for forming a core layer shall not specifically be restricted in a material as long as it is a support for supporting the resin film for forming a core layer, and it includes suitably polyesters such as polyethylene terephthalate (PET) and the like and polyolefins such as polypropylene, polyethylene and the like from the viewpoints that the above substrate is readily peeled off later from the resin film for forming a core layer and that they have a heat resistance and a solvent resistance.

Further, a flexible substrate of a high transparent type is preferably used from the viewpoint of enhancing a transmission factor of a light for exposure and reducing roughening on a side wall of the core pattern. The substrate of a high transparent type has a haze value of preferably 5% or less, more preferably 3% or less and particularly preferably 2% or less. The haze value is measured according to JIS K7105, and it can be measured by means of, for example, a commercially available turbidimeter such as NDH-1001DP (manufactured by Nippon Denshoku Industries Co., Ltd.). The above substrate is available as a commercial product including trade names "Cosmo Shine A1517" and "Cosmo Shine A4100" each manufactured by Toyobo Co., Ltd. "Cosmo Shine A1517" has the advantage that a gap to the mask in exposure is reduced and that finer patters can be formed.

A thickness of the above substrate falls preferably in a range of 5 to 50 μm. If it is 5 μm or more, the advantage that a strength of the support is easily obtained is provided, and it is 50 μm or less, the advantages that a gap to the mask in forming the core pattern is reduced and that finer patters can be formed are provided. From the viewpoints described above, a thickness of the above substrate falls in a range of more preferably 10 to 40 μm, further preferably 15 to 30 μm. It is particularly preferably 20 to 30 μm.

A thickness of the resin film for forming a core layer shall not specifically be restricted, and it falls preferably in a range of 10 to 100 μm in terms of a thickness after drying. If it is 10 μm or more, provided is the advantage that a coupling tolerance with light emitting and light receiving elements or an optical fiber can be expanded, and if it is 100 μm or less, provided is the advantage that a coupling efficiency with light emitting and light receiving elements or an optical fiber is enhanced. From the viewpoints described above, a thickness of the above film falls in a range of more preferably 30 to 70 μm. From the same viewpoints as described above, the thicknesses of the core layer and the core pattern fall in a range of preferably 10 to 100 μm, more preferably 30 to 70 μm.

The substrate used in a step for producing the resin film for forming a cladding layer includes the substrates described above in which Rz on a surface thereof is 0.5 μm or more and 10 μm or less. Among them, the metal foils are preferred from the same viewpoints as described above.

In the flexible optical waveguide of the present invention, when produced is, for example, the flexible optical waveguide in which Rz on the surface of the lower cladding layer is 0.5 μm or more and 10 μm or less and in which Rz on the surface of the upper cladding layer is less than 0.5 μm, a substrate in which Rz on a surface is less than 0.5 μm is preferably used as the substrate used in the step for producing the resin film for forming an upper cladding layer. The above substrate shall not specifically be restricted in a material as long as Rz on the surface is less than 0.5 μm, and it includes suitably polyesters such as polyethylene terephthalate and the like and polyolefins such as polypropylene, polyethylene and the like from the viewpoints that the above substrate is readily peeled off later from the resin film for forming an upper cladding layer and that they have a heat resistance and a solvent resistance. A thickness of the above substrate falls preferably in a range of 5 to 100 μm. If it is 5 μm or more, the advantage that a strength of the support is easily obtained is provided, and if it is 100 μm or less, the advantage that the reeling property in preparing the film in a roll form is enhanced is provided. From the viewpoints described above, a thickness of the above substrate falls in a range of more preferably 10 to 80 μm, further preferably 15 to 50 μm.

A thickness of the resin film for forming a cladding layer shall not specifically be restricted as long as it is possible to shut up a light and embed the core, and it falls preferably in a range of 5 to 500 μm in terms of a thickness after drying. If it is 5 μm or more, a thickness of t the cladding layer which is required for shutting up a light can be secured, and if it is 500 μm or less, it is easy to evenly control the film thickness. From the viewpoints described above, a thickness of the above film falls in a range of more preferably 10 to 100 μm.

The resin film for forming an optical waveguide provided on the substrate thus obtained can readily be stored by, for example, reeling in a roll form. Further, a protective film can be provided, if necessary, on the resin film for forming an optical waveguide. The substrate and the protective film may be subjected to antistatic treatment in order to make it easy to peel off the resin film for forming an optical waveguide later.

A thickness of the cladding layer (the whole part of the upper cladding layer and the lower cladding layer) may be the same or different in the lower cladding layer which is first formed and the upper cladding layer for embedding the core pattern. Also, a thickness of the upper cladding layer is preferably larger than a thickness of the core layer in order to embed the core pattern.

From the viewpoints that the whole part of the flexible optical waveguide is reduced in a thickness and that more excellent flexibility is exhibited, when a thickness of the core pattern falls in a range of 10 to 100 μm described above, a thickness of the cladding layer in the whole part of the flexible optical waveguide falls preferably in a range of 30 to 400 μm; a thickness of the upper cladding layer falls preferably in a range of 20 to 300 μm; and a thickness of the lower cladding layer falls preferably in a range of 10 to 100 μm. Further, when a thickness of the core pattern falls in a range of 30 to 70 μm which is a preferred range, a thickness of the cladding layer in the whole part of the flexible optical waveguide falls preferably in a range of 60 to 130 μm; a thickness of the upper cladding layer falls preferably in a range of 40 to 80 μm; and a thickness of the lower cladding layer falls preferably in a range of 20 to 50 μm. A thickness of the upper cladding layer is a value from a boundary between the core pattern and the lower cladding layer to an upper face of the upper cladding layer, and a thickness of the lower cladding layer is a value from a boundary between the core pattern and the lower cladding layer to an under face of the lower cladding layer.

In the resin composition for forming an optical waveguide or the resin film for forming an optical waveguide described above, a cured matter thereof has preferably an optical transmission loss of 0.5 dB/cm or less from the viewpoint of inhibiting a reduction in an intensity of a transmission signal which is brought about by optical loss. In this regard, the optical transmission loss is a value measured by a prism-coupler type optical characteristic measuring apparatus (SPA-4000, manufactured by SAIRON TECHNOLOGY, Inc.).

Production Process for Flexible Optical Waveguide:

A production process for the flexible optical waveguide of the present invention is a production process for a flexible optical waveguide comprising a lower cladding layer, a core pattern and an upper cladding layer, and it is a production process for a flexible optical waveguide comprising a step in which a resin film for forming a cladding layer prepared on a substrate having a ten point average roughness (Rz) of 0.5 μm or more and 10 μm or less on a surface thereof is used for at least one of the lower cladding layer and the upper cladding layer to prepare an optical waveguide and a step in which the above substrate is then removed from the resin film for forming a cladding layer. According to the above process, the surface form of the above substrate can be transferred onto the film by removing the substrate from the resin film, and therefore the surface of the cladding layer comprising the above film can be roughened at the same time as preparing the optical waveguide. This makes it unnecessary to carry out separately roughening processing and makes it possible to simplify the step.

In the production step for the flexible optical waveguide, a substrate is necessary as a support for the lower cladding layer and the substrate is also used as a substrate for subjecting to roughening process to thereby make it possible to simplify the step. From the viewpoint described above, the resin film for forming a cladding layer prepared on the substrate in which Rz on a surface is 0.5 μm or more and 10 μm or less is used preferably at least for the lower cladding layer.

The materials described above are used for the substrate in which Rz on a surface is 0.5 μm or more and 10 μm or less. Among them, the metal foils are preferred from the viewpoints that the resin film for forming a cladding layer can readily be prepared and that a satisfactory strength thereof as a support and the productivity are obtained.

A process shown in FIG. 1 shall be described in details as one example of the production process for the flexible optical waveguide of the present invention.

First, a resin film for forming a cladding layer prepared on a substrate 1 is cured by a light or heating in a first step to form a lower cladding layer 2 (FIG. 1 (*a*)). In this case, a substrate in which Rz on a surface (a surface on which the cladding layer is to be formed) is 0.5 μm or more and 10 μm or less is used for the substrate 1.

In the first step for forming the lower cladding layer 2, when a protective film is provided on a side opposite to the substrate film in the resin film for forming a cladding layer, the resin film for forming a cladding layer is cured by a light or heating after the protective film is peeled off to form the lower cladding layer 2.

An irradiation dose of an actinic ray in forming the lower cladding layer 2 is preferably 0.1 to 5 J/cm$^2$, and the heating temperature is preferably 50 to 130° C., but these conditions shall not specifically be restricted.

Next, a resin film for forming a core layer is laminated on the lower cladding layer 2 in a second step to form a core layer 3 (FIG. 1 (*b*)). In this second step, the resin film for forming a core layer is bonded on the cladding layer 2 described above under pressure by heating to thereby laminate the core layer 3 having a higher refractive index than that of the cladding layer. In this connection, the laminate method includes a method carried out by means of a roll laminator or a flat plate-type laminator, and lamination is carried out preferably under reduced pressure from the viewpoint of a tight adhesiveness and a followability. In particular, the resin film for forming a core layer is preferably laminated under reduced pressure by means of the flat plate-type laminator. In the present invention, the flat plate-type laminator means such a laminator having a pair of flat plates between which materials to be laminated are sandwiched and press-bonded to each other by applying a pressure to the flat plates. For example, a vacuum pressure-type laminator may be suitably used as the flat plate-type laminator. In this regard, the heating temperature is preferably 50 to 130° C., and the bonding pressure is preferably 0.1 to 1.0 MPa (1 to 10 kgf/cm$^2$), but these conditions shall not specifically be restricted.

Before the lamination procedure using the vacuum pressure-type laminator, the resin film for forming a core layer may be preliminarily attached onto the lower cladding layer 2 using a roll laminator. In this case, from the viewpoints of a tight adhesiveness and a followability, the preliminary attachment between the resin film and the lower cladding layer is preferably conducted while press-bonding these layers to each other. The press-bonding may be performed while heating by using a laminator having a heating roll. The laminate temperature falls preferably in a range of room temperature (25° C.) to 10° C. If it is room temperature or higher, a tight adhesiveness between the lower cladding layer 2 and the core layer 3 is improved, and if it is 100° C. or lower, the needed film thickness is obtained without allowing the core layer 3 to flow in roll lamination. From the viewpoints described above, the laminate temperature falls more preferably in a range of 40 to 100° C. The pressure is preferably 0.2 to 0.9 MPa, and the laminate speed is preferably 0.1 to 3 m/minute, but these conditions shall not specifically be restricted.

The resin film for forming a core layer is easily handled and therefore preferred as long as it is prepared on a substrate film 4 for a core layer. Further, the core layer 3 can be formed as well by a method in which a resin composition for forming a core layer is dissolved in a solvent to prepare a resin varnish and in which it is applied on the lower cladding layer 2 by a spin coating method and the like, followed by removing the solvent.

Next, the core layer 3 is exposed to a light and developed in a third step to form a core pattern 6 of an optical waveguide (FIGS. 1 (c) and (d)). To be specific, an actinic ray is irradiated in an image-like manner through a photo mask 5. A light source for the actinic ray includes, for example, publicly known light sources which effectively radiate a UV ray such as a carbon arc lamp, a mercury vapor arc lamp, a ultra-high pressure mercury lamp, a high pressure mercury lamp, a Xenon lamp and the like. In addition thereto, light sources which effectively radiate a visible light such as a flood bulb for photography, a sunlight lamp and the like can be used as well. An irradiation dose of the actinic ray is preferably 0.01 to 10 J/cm$^2$. If it is 0.01/cm$^2$ or more, curing reaction proceeds sufficiently, and the core pattern is not lost by flowing in a developing step described later. If it is 10/cm$^2$ or less, the core pattern is prevented from growing larger by excess exposure, and fine patterns can suitably be formed. From the viewpoints described above, the irradiation dose falls in a range of more preferably 0.05 to 5 J/cm$^2$, particularly preferably 0.1 to 2 J/cm$^2$. Suitably controlling an irradiation dose of a UV ray in the range described above makes it possible to reduce a line width and a line gap of the core patterns, and controlling an irradiation dose of a UV ray to, for example, 0.2 J/cm$^2$ makes it possible to form fine patterns having a line width of 50 μm and a line gap of 75 μm.

Next, when the substrate film 4 for a core layer remains, the above substrate is peeled off, and then unexposed parts are removed by wet development or the like to carry out development, whereby a waveguide pattern is formed. In the case of wet development, development can be carried out by a publicly known method such as spraying, shaking immersion, brushing, scrubbing and the like using an organic solvent base developer which is suited to the composition of the film described above.

The organic solvent base developer includes, for example, acetone, methanol, methyl ethyl ketone, methyl isobutyl ketone, cyclohexanone, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene, N,N-dimethylformamide, N,N-dimethylacetamide, N-methylpyrrolidone and the like. Water is preferably added in a range of 1 to 20 mass % to the above organic solvents in order to prevent ignition. The above organic solvents can be used alone or in combination of two or more kinds thereof. The specific examples of the developer suitably include, for example, a 2:8 mixed solution (mass ratio) of N,N-dimethylacetamide and propylene glycol monomethyl ether acetate from the viewpoint that the development can be carried out without causing peeling of the core patterns.

The developing method includes, for example, a dipping method, a puddle method, a spray method such as a high pressure spray method, brushing, scrubbing and the like.

The core patterns in the optical waveguide may be washed as treatment after development by using the organic solvent shown above.

The organic solvent base washing solution includes, for example, acetone, methanol, ethanol, isopropanol, ethyl acetate, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene and the like. Among them, methanol, ethanol, isopropanol and ethyl acetate are preferably used from the viewpoint of a solubility. Further, isopropanol is preferably used from the viewpoint that development can be carried out without producing developing residues. Water can be added in a range of 1 to 20 mass % to the above organic solvents in order to prevent ignition. The organic solvents described above can be used alone or in combination of two or more kinds thereof.

The washing method includes, for example, a dipping method, a puddle method, a spray method such as a high pressure spray method, brushing, scrubbing and the like.

The core patterns of the optical waveguide may be cured, if necessary, further more by carrying out heating of 60 to 250° C. or exposure of 0.1 to 1000 mJ/cm$^2$ as treatment after developing and washing Subsequently, a resin film for forming a cladding layer for embedding a core pattern 6 is laminated and cured in a fourth step to form an upper cladding layer 7 (FIG. 1 (e)). In this regard, a thickness of the upper cladding layer 7 is preferably larger, as described above, than a thickness of the core pattern 6. Curing is carried out by a light or heat in the same manner as described above.

The laminate method in the fourth step includes a method carried out by means of a roll laminator or a flat plate-type laminator, and from the viewpoint of a tight adhesiveness, a followability and a flatness, the resin film for forming a cladding layer is preferably laminated under reduced pressure, as is the case with the second step, by means of the flat plate-type laminator, suitably the vacuum pressure type laminator. In this regard, the heating temperature is preferably 50 to 130°

C., and the bonding pressure is preferably 0.1 to 1.0 MPa (1 to 10 kgf/cm²), but these conditions shall not specifically be restricted.

Curing in the fourth step is carried out, as is the case with the first step, by a light and/or heat. An irradiation dose of an actinic ray in forming the upper cladding layer 7 is preferably 0.1 to 30 J/cm².

When a support film for the resin film for forming a cladding layer described above is PET, an irradiation dose of an actinic ray is preferably 0.1 to 5 J/cm². If an irradiation dose of a UV ray falls in the range described above, curing can sufficiently be carried out. Firm curing can be carried out, and an effect of reducing an optical loss of the optical waveguide can be obtained by controlling an irradiation dose of a UV ray to, for example, 2 J/cm². From the viewpoint described above, the irradiation dose is more preferably 0.5 to 5 J/cm², particularly preferably 1 to 4 J/cm².

On the other hand, when the above support film is polyethylene naphthalate, polyamide, polyimide, polyamideimide, polyetherimide, polyphenylene ether, polyether sulfide, polyether sulfone, polysulfone or the like, which hardly allow an actinic ray having a short wavelength such as a UV ray to pass through as compared with PET, and therefore an irradiation dose of an actinic ray is preferably 0.5 to 30 J/cm². If it is 0.5 J/cm² or more, curing reaction proceeds sufficiently, and if it is 30 J/cm² or less, longer time is not required for light irradiation. From the viewpoints described above, the irradiation dose is more preferably 3 to 27 J/cm², particularly preferably 5 to 25 J/cm².

In order to expedite curing more, a double face exposing machine in which both faces can be irradiated with an actinic ray at the same time can be used. Further, irradiation with an actinic ray may be carried out while heating. The heating temperature during and/or after irradiation with an actinic ray is preferably 50 to 200° C., but these conditions shall not specifically be restricted.

A film prepared on a substrate is preferably used as the resin film for forming a cladding layer in the present step from the viewpoint of easier handling. In this case, the resin film for forming a cladding layer is laminated on a core pattern 6 side. In this regard, a substrate in which Rz on a surface (a surface on which the cladding layer is formed) is 0.5 μm or more and 10 μm or less is used as the substrate to form an upper cladding layer 7, and then the above substrate is removed, whereby a flexible optical waveguide in which Rz on the surface of the upper cladding layer 7 is 0.5 μm or more and 10 μm or less can be prepared as well. Further, the upper cladding layer 7 can be formed as well by a method in which a resin composition for forming a cladding layer is dissolved in a solvent to prepare a resin varnish and in which it is applied by a spin coating method or the like, followed by removing the solvent and curing the resin composition.

Thereafter, the substrate 1 used in the first step is removed in a fifth step (FIG. 1 (f)). A roughened form on the substrate is transferred by removing the substrate 1, and a flexible optical waveguide having a roughened form surface 8 on the lower cladding layer 2 can be prepared.

A method for removing the substrate 1 shall not specifically be restricted, and when the above substrate 1 is a metal foil, it can be carried out by etching and is advantageous for the productivity.

According to the production process described above, a flexible optical waveguide having an improved adhesive property which has so far been a target can be obtained.

EXAMPLES

The present invention shall be explained below in further details with reference to production examples and examples, but the present invention shall by no means be restricted by these production examples and examples.

Production Example 1

Preparation of a Resin Varnish for a Core and a Clad

A resin composition for forming a core layer and a resin composition for forming a cladding layer were prepared in a blend composition shown in Table 1, and 40 mass parts of methyl ethyl ketone based on the whole amount was added thereto as a solvent. The solution was weighed in a wide mouth plastic bottle and stirred for 6 hours on the conditions of a temperature of 25° C. and a rotating speed of 400 rpm by means of a mechanical stirrer, a shaft and a propeller to prepare a resin varnish for a core and a clad. Then, the resin varnish was filtrated under pressure through a polyflon filter having a pore diameter of 2 μm (trade name: PF020, manufactured by Advantec Toyo Kaisha, Ltd.) and a membrane filter having a pore diameter of 0.5 μm (trade name: J050A, manufactured by Advantec Toyo Kaisha, Ltd.) on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar. In the blend composition shown in Table 1, the blending amounts of a base polymer (A) and a photopolymerizable compound (B) are shown by mass % based on the whole amount of the component (A) and the component (B), and a blending amount of a photopolymerization initiator (C) is shown by a proportion (mass part) based on the whole amount 100 mass parts of the component (A) and the component (B).

TABLE 1

| Item | Base polymer (A) | Photopolymerizable compound (B) | Photopolymerization initiator (C) |
|---|---|---|---|
| For core | Phenotohto YP-70[*1] (20.4 mass %) | A-BPEF[*2] (39.8 mass %) EA-1020[*3] (39.8 mass %) | Irgacure 819[*5] (1 mass part) Irgacure 2959[*6] (1 mass part) |
| For cladding | Phenotohto YP-70[*1] (35.7 mass %) | KRM-2110[*4] (64.3 mass %) | SP-170[*7] (2 mass parts) |

[*1]Phenotohto YP-70; bisphenol A/bisphenol F copolymer type phenoxy resin (manufactured by Tohto Kasei Co., Ltd.)
[*2]A-BPEF; 9,9-bis[4-(2-acryloyloxyethoxy)phenyl]fluorene (manufactured by Shin-Nakamura Chemical Co., Ltd.)
[*3]EA-1020; bisphenol A type epoxyacrylate (manufactured by Shin-Nakamura Chemical Co., Ltd.)
[*4]KRM-2110; alicyclic diepoxy carboxylate (manufactured by Adeka Corporation)
[*5]Irgacure 819; bis(2,4,6-trimethylbenzoyl)phenylphosphine oxide (manufactured by Ciba Specialty Chemicals K.K.)
[*6]Irgacure 2959; 1-[4-(2-hydroxyethoxy)phenyl]-2-hydroxy-2-methyl-1-propane-1-one (manufactured by Ciba Specialty Chemicals K.K.)
[*7]SP-170; triphenylsulfonium hexafluoroantimonate (manufactured by Akeda Corporation)

Production Example 2

Preparation of a Resin Film for Forming a Core Layer

A resin film for forming a core layer was prepared by applying the resin varnish for a core obtained in Production Example 1 described above on a PET film (trade name "A-4100", thickness: 25 μm, Rz (non-treated surface): 0.1 μm, coated face: non-treated surface, manufactured by Toyobo Co., Ltd.) by means of an applicator ("YBA-4", manufactured by Yoshimitsu Seiki Co., Ltd.) and drying the solvent at 80° C. for 10 minutes and then at 100° C. for 10 minutes. In this case, a thickness of the resin film for forming a core layer could optionally be controlled in a range of 5 to 100 μm by controlling a gap of the applicator, and it was controlled in the present production example so that the film thickness after curing was 50 μm.

Production Example 3

Preparation of a Resin Film for Forming Upper and Lower Cladding Layers

A resin film for forming an upper cladding layer was prepared by applying the resin varnish for a cladding obtained in Production Example 1 described above on the PET film (the same as described above) in the same manner as described above. A thickness of the resin film for forming an upper cladding layer was set to 80 μm.

On the other hand, a resin film for forming a lower cladding layer was prepared by applying the resin varnish for a cladding obtained in Production Example 1 described above on a glossy surface of a copper foil (trade name "GTS-35", thickness: 35 μm, Rz (glossy surface): 2.1 μm, manufactured by Furukawa Circuit Foil Co., Ltd.) and drying the solvent at 80° C. for 10 minutes and then at 100° C. for 10 minutes. A thickness of the resin film for forming a lower cladding layer was set to 30 μm.

A refractive index of the resin film for forming an optical waveguide in the present production example was measured (measuring wavelength: 830 nm) by means of a prism coupler (Model 2020) manufactured by Metricon Corporation to find that a refractive index of the resin film for forming a core layer was 1.583 and that a refractive index of the resin film for forming a cladding layer was 1.550.

Example 1

Production of a Flexible Optical Waveguide

Forming Step of a Lower Cladding Layer:
The resin film for forming a lower cladding layer prepared on the copper foil (substrate 1) which was obtained in Production Example 3 described above was irradiated with a UV ray (wavelength: 365 nm) at an intensity of 1 J/cm² by means of a UV exposing equipment (EXM-1172, manufactured by ORC manufacturing Co., Ltd.) to form a lower cladding layer 2 (FIG. 1(a)).
Forming Step of a Core Pattern:
Next, the resin varnish for forming a core layer obtained in Production Example 2 described above was laminated on the lower cladding layer 2 by means of a vacuum press on the conditions of a pressure of 0.5 MPa, a temperature of 50° C. and a pressurization time of 30 seconds to form a core layer 3 (FIG. 1(b)). Subsequently, the core layer was irradiated with a UV ray (wavelength: 365 nm) at an intensity of 1 J/cm² through a photo mask 5 by means of the UV exposing equipment described above (FIG. 1(c)). Then, the PET film (the substrate film 4 for the core layer) was peeled off, and the core pattern 6 was developed using N,N-dimethylacetamide as a solvent (FIG. 1 (d)). Methanol and water were used for washing away the developer.
Forming Step of an Upper Cladding Layer:
Next, the resin film for forming an upper cladding layer obtained in Production Example 3 described above was laminated on the same conditions as that on which core layer 3 formed and irradiated with a UV ray (wavelength: 365 nm) at an intensity of 1 J/cm², and the PET film (the substrate film for the upper cladding layer) was peeled off. Then, heat treatment was carried out subsequently at 160° C. for one hour to form an upper cladding layer 7 (FIG. 1(e)).
Removing Step of a Copper Foil:
Finally, the copper foil which was a supporting substrate for the resin film for forming a lower cladding layer was dissolved with a ferric chloride aqueous solution (trade name "H-20L", manufactured by Sunhayato Corp.) to obtain a flexible optical waveguide (FIG. 1(f)).

A surface roughness of the above flexible optical waveguide was measured by means of a surface roughness measuring equipment (trade name "SURFCORDER SE-2300", manufactured by Kosaka Laboratory Ltd.) to find that Rz at a lower cladding layer side was 3.0 μm and that Rz at an upper cladding layer side was 0.3 μm.

A transmission loss of the flexible optical waveguide thus prepared was measured using VCSEL (FLS-300-01-VCL, manufactured by EXFO Corporation) of 855 nm as a light source and a light-receiving sensor (Q82214, manufactured by Advantest Corporation) by a cut-back method (measuring waveguide lengths: 5, 3, and 2 cm, input fiber: GI-50.525 multimode fiber (NA=0.20), output fiber: SI-114/125 (NA=0.22)) to find that it was 0.1 dB/cm.

Figure 2:
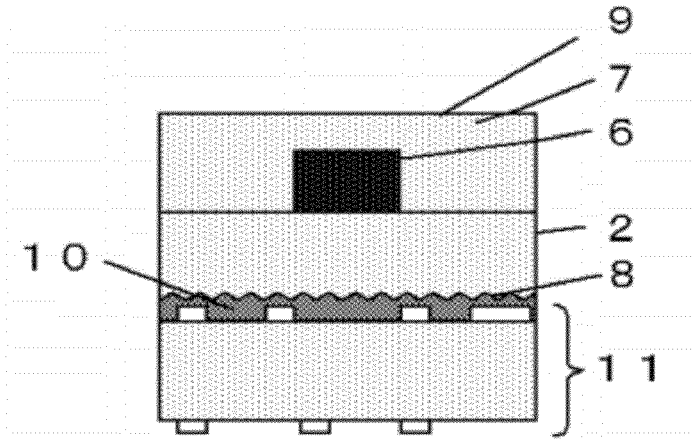
FIG. 2 is a drawing for explaining a compounding example of the flexible optical waveguide of the present invention and an electric printed wiring board.

An adhesive film (brand name "Hiattach HS-230", thickness: 25 μm, manufactured by Hitachi Chemical Co., Ltd.) was used as an adhesive to adhere a lower cladding layer side of the flexible optical waveguide prepared above to an electric printed wiring board 11 (brand name "MCL-E-679F", manufactured by Hitachi Chemical Co., Ltd., an electric printed wiring circuit for test is available) in a form shown in FIG. 2. As a result thereof, the flexible optical waveguide could be adhered to the electric printed wiring board 11.

Figure 3:
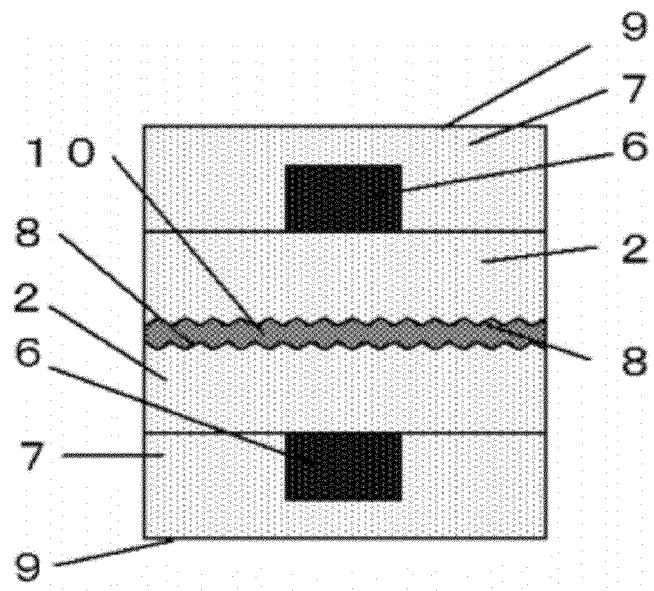
FIG. 3 is a drawing for explaining a multilayering example of the flexible optical waveguides of the present invention.

Further, the above adhesive film was used to carry out adhesion between the lower cladding layer sides of the flexible optical waveguides prepared in a form shown in FIG. 3. As a result thereof, adhesion between the flexible optical waveguides was possible.

Industrial Applicability

The flexible optical waveguide of the present invention is excellent in an adhesive property. According to the present invention, a flexible optical waveguide which has a good productivity and is excellent in an adhesive property can be produced. This makes it easy to turn flexible optical waveguides into a multilayer and compound it with an electric printed wiring board and makes it possible to apply the flexible optical waveguide of the present invention to a wide field such as optical interconnection and the like.

The invention claimed is:
1. A production process for a flexible optical waveguide comprising a lower cladding layer, a core pattern and an upper cladding layer, comprising:
a step in which a resin film for forming a cladding layer, prepared on a substrate having a ten point average roughness (Rz) of 0.5 μm or more and 10 μm or less on a surface thereof, is used for the lower cladding layer to prepare an optical waveguide, the resin film having a first surface adjacent the substrate and a second surface opposite to the first surface, a resin composition for forming the resin film being curable by ultraviolet radiation, the resin film being prepared by curing the resin composition using ultraviolet radiation,
after preparing the resin film for forming the lower cladding layer, a step in which the above substrate is then removed from the resin film for forming the lower cladding layer, leaving said first surface of the resin film which had been adjacent the substrate and said second surface opposite to the first surface, Rz on said first surface, after removal of the substrate, being 0.5 μm or more and 10 μm or less; and a step in which the core pattern of the flexible optical waveguide is provided adjacent the second surface of the lower cladding layer, the core pattern having an optical path transforming part, and the upper cladding layer is provided adjacent the core pattern, the upper cladding layer having a first surface adjacent the core pattern and a second surface opposite the first surface of the upper cladding layer, the second surface of the upper cladding layer having an Rz less than 0.5 μm, the upper cladding layer being formed from a resin composition that is curable by ultraviolet radiation, and wherein providing the upper cladding layer includes curing the resin composition for forming the upper cladding layer by ultraviolet radiation, and wherein providing the core pattern includes exposing and developing a core layer to form the core pattern, said exposing being an exposure of the core layer to an actinic ray with an irradiation dose of 0.01 to 10 J/cm$^2$.

2. The production process for a flexible optical waveguide according to claim 1, wherein the substrate having a ten point average roughness (Rz) of 0.5 μm or more and 10 μm or less on a surface thereof is a metal foil.

3. The production process for a flexible optical waveguide according to claim 1, including a further step, after removing the substrate, of adhering the first surface of the resin film, which had been adjacent the substrate, to a printed wiring board.

4. The production process for a flexible optical waveguide according to claim 2, wherein said metal foil is removed by etching.

5. The production process for a flexible optical waveguide according to claim 2, wherein said metal foil has a thickness of 10 to 60 μm.

6. The production process for a flexible optical waveguide according to claim 5, wherein said metal foil has a thickness of 25 to 45 μm.

7. The production process for a flexible optical waveguide according to claim 1, further comprising a step of preparing said resin film on and in contact with said surface of said substrate having the ten point average roughness (Rz) of 0.5 μm or more and 10 μm or less.

8. The production process for a flexible optical waveguide according to claim 1, wherein said resin film is prepared in contact with said substrate.

9. The production process for a flexible optical waveguide according to claim 1, wherein the core layer for forming the core pattern has a higher refractive index than that of said resin film for forming the lower cladding layer.

10. The production process for a flexible optical waveguide according to claim 1, wherein Rz on said first surface of the lower cladding layer is 1 to 5 μm.

11. The production process for a flexible optical waveguide according to claim 10, wherein Rz on said second surface of the upper cladding layer is 0.3 μm or less.

12. The production process for a flexible optical waveguide according to claim 1, wherein said first surface of the resin film mirrors the surface of the substrate on which the resin film was prepared, the substrate having been removed after forming the resin film so as to expose the first surface of the resin film.

13. The production process for a flexible optical waveguide according to claim 1, wherein said actinic ray is UV ray.

14. The production process for a flexible optical waveguide according to claim 1, wherein said irradiation dose falls within a range of 0.05 to 5 J/cm$^2$.

15. The production process for a flexible optical waveguide according to claim 14, wherein said irradiation dose falls within a range of 0.1 to 2 J/cm$^2$.

16. The production process for a flexible optical waveguide according to claim 1, wherein said core layer is formed of a resin film.

* * * * *